US010681706B2

(12) United States Patent
Ko et al.

(10) Patent No.: US 10,681,706 B2
(45) Date of Patent: Jun. 9, 2020

(54) METHOD AND APPARATUS FOR GENERATING SIGNAL FOR LOW LATENCY IN WIRELESS COMMUNICATION SYSTEM

(71) Applicant: LG ELECTRONICS INC., Seoul (KR)

(72) Inventors: Hyunsoo Ko, Seoul (KR); Heejeong Cho, Seoul (KR); Hyeyoung Choi, Seoul (KR); Ilmu Byun, Seoul (KR); Kungmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/039,059

(22) Filed: Jul. 18, 2018

(65) Prior Publication Data
US 2018/0332592 A1 Nov. 15, 2018

Related U.S. Application Data

(63) Continuation of application No. 15/119,352, filed as application No. PCT/KR2015/001190 on Feb. 5, 2015, now Pat. No. 10,057,906.
(Continued)

(51) Int. Cl.
*H04W 72/08* (2009.01)
*H04B 17/24* (2015.01)
(Continued)

(52) U.S. Cl.
CPC ............ *H04W 72/08* (2013.01); *H04B 17/24* (2015.01); *H04B 17/364* (2015.01);
(Continued)

(58) Field of Classification Search
CPC ....... H04L 5/00; H04L 5/0007; H04L 5/0053; H04W 72/04; H04W 72/042;
(Continued)

(56) References Cited

U.S. PATENT DOCUMENTS 7,756,548 B2 * 7/2010 Laroia .................. H04L 5/0053
455/561
8,204,025 B2 6/2012 Cai et al.
(Continued)

FOREIGN PATENT DOCUMENTS

CN 101657979 2/2010
CN 101836373 9/2010
(Continued)

OTHER PUBLICATIONS

S. Shin et al., "Vehicle-to-Vehicle emergency message dissemination through the WiBro Network", IEEE Xplore Jun. 14, 2010, INC2010: Proceedings of the 6th International Conference on Networked Computing, May 2010, pp. 1-6. (Year: 2010).*
(Continued)

*Primary Examiner* — Tri H Phan
(74) *Attorney, Agent, or Firm* — Lee Hong Degerman Kang Waimey

(57) ABSTRACT

The present invention relates to a method and an apparatus for generating a signal for low latency in a wireless communication system. The method, according to one embodiment of the present invention, for a communication device generating a situation-reporting signal for low latency and transmitting the signal to a base station in a wireless communication system comprises the steps of: generating the situation-reporting signal on the basis of a pre-set, specific situation recognized by the communication device; and transmitting the generated situation-reporting signal to the base station, wherein the situation-reporting signal may be generated so as to have a subcarrier spacing which is a pre-set number of times larger than a subcarrier spacing of a legacy communication system, the pre-set number being an integer.

6 Claims, 10 Drawing Sheets

Related U.S. Application Data

(60) Provisional application No. 61/945,831, filed on Feb. 28, 2014.

(51) Int. Cl.
*H04B 17/364* (2015.01)
*H04L 5/00* (2006.01)
*H04W 72/04* (2009.01)
*G08G 1/09* (2006.01)

(52) U.S. Cl.
CPC .......... *H04L 5/0007* (2013.01); *H04L 5/0053* (2013.01); *H04W 72/042* (2013.01); *H04W 72/048* (2013.01); *G08G 1/094* (2013.01)

(58) Field of Classification Search
CPC ... H04W 72/048; H04W 72/08; H04W 72/24; H04W 48/12; H04W 72/0406; H04W 72/0446; H04W 72/1263; H04W 72/1273; H04W 72/1278; H04W 72/1289; H04W 74/006; H04W 88/02; H04W 88/04; H04B 17/364; H04B 17/24; G08G 1/094
See application file for complete search history.

(56) References Cited

U.S. PATENT DOCUMENTS

| | | | | |
|---|---|---|---|---|
| 8,477,697 | B2* | 7/2013 | Tsai | H04W 72/048 370/329 |
| 8,526,337 | B2 | 9/2013 | Moon et al. | |
| 9,247,471 | B2* | 1/2016 | Velev | H04W 4/50 |
| 9,277,426 | B1 | 3/2016 | Singh et al. | |
| 9,699,692 | B2 | 7/2017 | Brahmi et al. | |
| 9,705,991 | B2 | 7/2017 | Mader et al. | |
| 9,723,457 | B2 | 8/2017 | Brahmi et al. | |
| 9,736,847 | B2 | 8/2017 | Feng et al. | |
| 9,743,401 | B2 | 8/2017 | Kim et al. | |
| 9,763,248 | B2 | 9/2017 | Kim et al. | |
| 10,484,976 | B2* | 11/2019 | Ying | H04W 48/12 |
| 2005/0035878 | A1 | 2/2005 | Vassilevsky | |
| 2009/0122771 | A1 | 5/2009 | Cai | |
| 2009/0174572 | A1 | 7/2009 | Smith | |
| 2009/0185632 | A1 | 7/2009 | Cai et al. | |
| 2010/0226324 | A1* | 9/2010 | Lee | H04W 48/08 370/329 |
| 2011/0032850 | A1 | 2/2011 | Cai | |
| 2011/0170435 | A1 | 7/2011 | Kim et al. | |
| 2011/0300870 | A1* | 12/2011 | Chun | H04L 5/0007 455/437 |
| 2013/0010718 | A1* | 1/2013 | Horn | H04W 4/90 370/329 |
| 2013/0329711 | A1* | 12/2013 | Seo | H04J 11/0069 370/336 |
| 2015/0195827 | A1* | 7/2015 | Feng | H04W 72/048 380/270 |
| 2016/0183208 | A1 | 6/2016 | Lee et al. | |
| 2017/0019905 | A1 | 1/2017 | Ko et al. | |

FOREIGN PATENT DOCUMENTS

| | | |
|---|---|---|
| CN | 102857463 | 1/2013 |
| JP | 3850842 | 11/2006 |
| KR | 10-0668442 | 1/2007 |
| KR | 10-2009-0000062 | 1/2009 |
| KR | 10-1092241 | 12/2011 |
| KR | 1020120102843 | 9/2012 |
| KR | 10-2013-0022523 | 3/2013 |
| KR | 1020130110771 | 10/2013 |
| WO | 2014005629 | 1/2014 |

OTHER PUBLICATIONS

Sang-woo Chang et al., "Implementation of DSRC Mobile MAC for VANET", ISBN 978-89-5519-155-4, Feb. 13-16, 2011 ICACT2011, pp. 1502-1505. (Year: 2011).*

U.S. Appl. No. 15/119,352, Notice of Allowance dated May 3, 2018, 9 pages.

U.S. Appl. No. 15/119,352, Office Action dated Dec. 20, 2017, 23 pages.

The State Intellectual Property Office of the People's Republic of China Application Serial No. 201580011094.5, Office Action dated Apr. 4, 2018, 17 pages.

Martin Kasparick, et al., "5G Waveform Candidate Selection," 5GNOW_D3.1_v1.0.docx, Version 1.0, dated Nov. 21, 2013, pp. 1-110.

PCT International Application No. PCT/KR2015/001190, Written Opinion of the International Searching Authority dated Apr. 28, 2015, 18 pages.

PCT International Application No. PCT/KR2015/001275, Written Opinion of the International Searching Authority dated Apr. 27, 2015, 21 pages.

European Patent Office Application Serial No. 15755837.0, Search Report dated Aug. 31, 2017, 23 pages.

Araniti, Giuseppe et al., "LTE for Vehicular Networking: A Survey," Topics in Automotive Networking and Applications, XP011508755, May 2013, 10 pages.

Mogensen, Preben et al., "5G small cell optimized radio design," Globecom 2013 Workshop—Emerging Technologies for LTE-Advanced and Beyond-4G, XP032599888, Dec. 2013, 6 pages.

* cited by examiner

FIG. 3
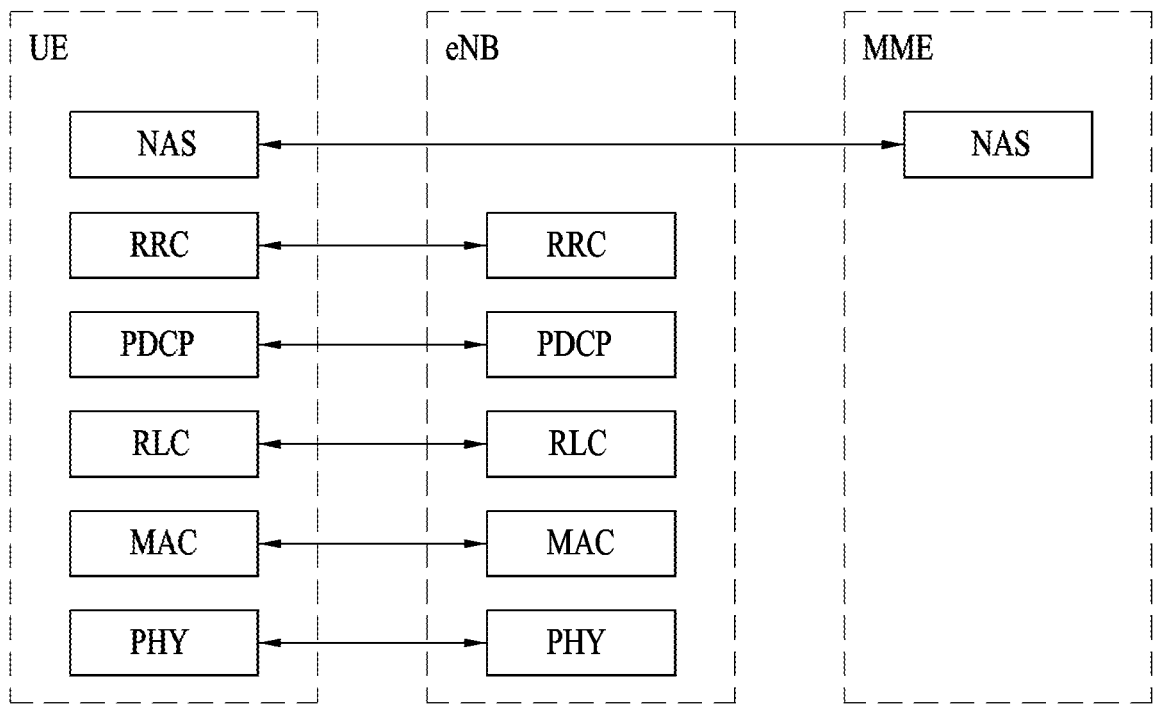
(a) Control-Plane Protocol Stack
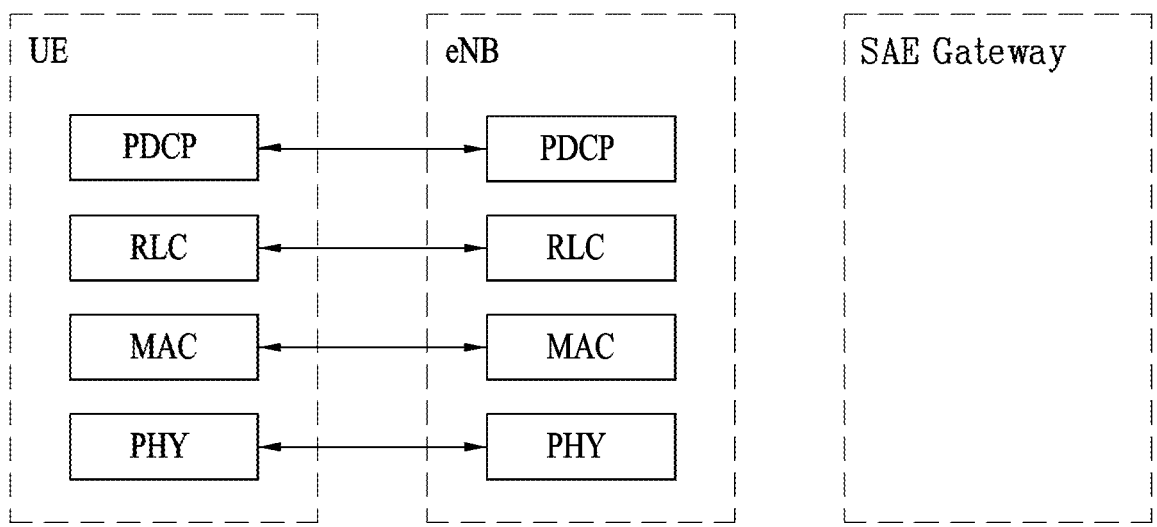
(b) User-Plane Protocol Stack

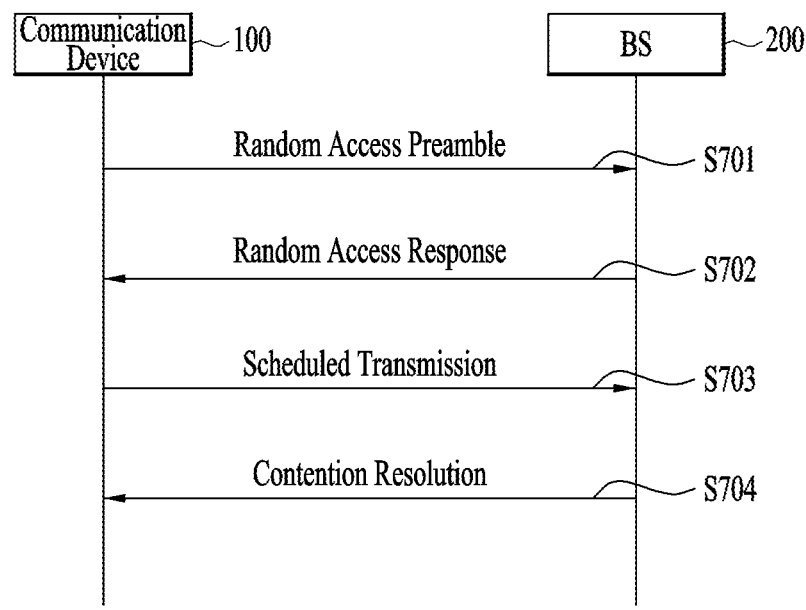
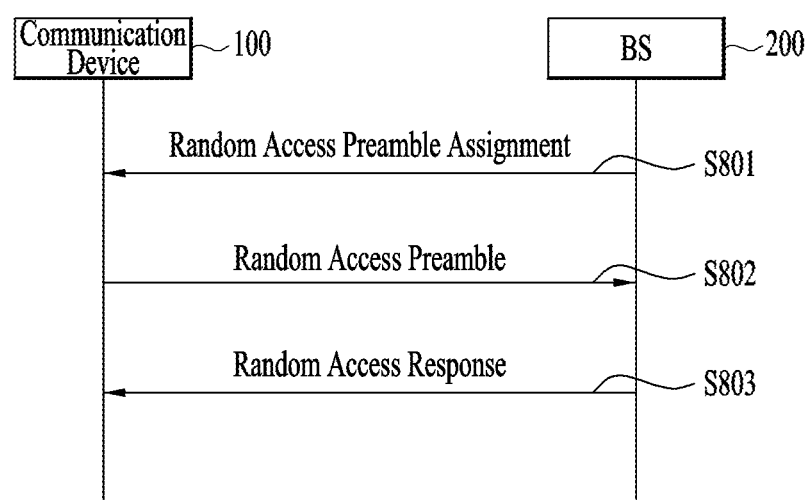

METHOD AND APPARATUS FOR GENERATING SIGNAL FOR LOW LATENCY IN WIRELESS COMMUNICATION SYSTEM

CROSS-REFERENCE TO RELATED APPLICATIONS

This application is a continuation of U.S. patent application Ser. No. 15/119,352, filed on Aug. 16, 2016, now U.S. Pat. No. 10,057,906, which is the National Stage filing under 35 U.S.C. 371 of International Application No. PCT/KR2015/001190, filed on Feb. 5, 2015, which claims the benefit of U.S. Provisional Application No. 61/945,831, filed on Feb. 28, 2014, the contents of which is are all hereby incorporated by reference herein in their entirety.

TECHNICAL FIELD

The present invention relates to a wireless communication system, and more particularly, to a method for generating a signal for short latency in a wireless communication system, and an apparatus supporting the same.

BACKGROUND ART

Along with the recent development of wireless communication technology, wireless communication has been extended its application from human communication to device-to-device communication or the Internet of things. Accordingly, it is expected that all things around us will be interconnected through a wireless communication network and controlled wirelessly in the near future.

If such an era is defined as a networked society, the requirements of a wireless network design for building the networked society may include device-to-device communication without human intervention, ultra-connectivity that may reduce a latency between devices, and ultra-short latency/high-reliability transmission between devices.

Device-to-device communication or the Internet of things may find its applications in a variety of fields around us. Particularly, it may be used for building an Intelligent Transport System (ITS) being one of services available through convergence between a wireless communication technology and a vehicle as well as in industry automation or autonomous vehicles.

The services available through convergence between a wireless communication technology and a vehicle may include self-driving of vehicles, provisioning of high-reliability real-time traffic information, and provisioning of a high-quality wireless communication environment to a passenger in a vehicle.

Conditions required to realize such a service through convergence between a wireless communication technology and a vehicle vary depending on the property of the provided service. In regard to a wireless communication-based vehicle safety service, if the requirements of accurate recognition and instantaneous indication of an emergency situation are considered for the service, a wireless communication technology that enables ultra-short latency and high-reliability transmission should be applied. If a high-quality wireless communication environment is to be provided to a vehicle passenger, a wireless communication technology that maintains a uniform channel quality in any situation is preferably applied.

More specifically, the wireless communication-based vehicle safety service may refer to a service in which when it is determined that a vehicle is likely to face emergency due to an external or internal factor or a device of a vehicle is abnormal, the emergency or the abnormal state of the device is notified to a vehicle user through an in-vehicle communication network so that the vehicle user may efficiently handle the problem.

The in-vehicle communication network may be divided largely into a vehicle internal network and a vehicle external network. A vehicle internal network called In Vehicle Network (IVN) is a wireless/wired communication network between sensors, electronic devices, or devices inside a vehicle. The IVN is a technology used to notify a vehicle user of an emergency situation or an abnormal part of the vehicle, as described above.

Besides the IVN technology, the vehicle communication network may also include a vehicle external network, that is, an out-vehicle network from the perspective of a vehicle.

The vehicle safety service using the foregoing IVN is provided to a driver by a specific indication through an audio, a gauge, or the like in a vehicle. However, this information is perceivable only to the driver of the vehicle.

Since the driver of a following vehicle or a nearby vehicle has no way to perceive the above information, the following vehicle or the nearby vehicle may cause an accident to the vehicle, or the vehicles together may be subject to a secondary accident even though the driver of the vehicle takes an appropriate action with the vehicle safety service based on the IVN.

To overcome the problem, a vehicle safety service using a vehicle external network as well as the vehicle safety service using an IVN is continuously studied.

That is, the vehicle safety service using a vehicle external network has been introduced to provide a vehicle safety service using a vehicle communication network technology in relation to other nearby vehicles. Vehicle external networks may be classified largely into Vehicle to Infrastructure (V2I) and Vehicle to Vehicle (V2V).

V2I refers to communication infrastructure between a vehicle and its adjacent Base Station (BS), and V2V refers to communication infrastructure between a vehicle and another vehicle.

If V2I is used, a vehicle may receive traffic information from an adjacent BS, and transmit location information about the vehicle or emergency information sensed by the vehicle to the adjacent BS. The BS and other vehicles share the emergency situation through the transmitted information.

If V2V is used, a vehicle may receive traffic information from a nearby vehicle and may also exchange emergency information sensed by each vehicle.

The foregoing vehicle safety services using a vehicle external network, V2I and V2V may be used mainly for the purpose of sharing information between a vehicle and another object. However, to transmit information to be shared, initial access is performed at each communication. Thus, a long latency is incurred by the initial access.

Accordingly, there is a need for a method for reducing a latency incurred by the initial access. Thus, it is necessary to generate a signal for short latency in a wireless communication system.

DISCLOSURE

Technical Problem

An object of the present invention devised to fulfill the above conventional need is to provide a method for generating a short-latency signal in a wireless communication system.

Another object of the present invention is to provide a method for generating a short-latency signal having a subcarrier spacing larger than a subcarrier spacing of a legacy communication system by an integer times.

Another object of the present invention is to provide a method for generating a short-latency signal that may reuse parameters of a legacy system.

Another object of the present invention is to provide a method for transmitting a generated short-latency signal to another device during a downlink transmission period.

Another object of the present invention is to provide an apparatus supporting the above methods.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In one aspect of the present invention, a method for generating a situation report signal for short latency and transmitting the generated situation report signal to a Base Station (BS) by a communication device in a wireless communication system includes generating the situation report signal based on a predetermined specific situation perceived by the communication device, and transmitting the generated situation report signal to the BS. The situation report signal is generated to have a subcarrier spacing larger than a subcarrier spacing of a legacy communication system by a predetermined integer times.

In the method for generating a short-latency signal in a wireless communication system according to the present invention, the predetermined integer may be 16.

In the method for generating a short-latency signal in a wireless communication system according to the present invention, the situation report signal may include one or more new symbols and a Cyclic Prefix (CP) within one symbol period of the legacy communication system.

In the method for generating a short-latency signal in a wireless communication system according to the present invention, the number of the new symbols and a length of the CP may be determined based on the subcarrier spacing and a time-domain period of the situation report signal.

In the method for generating a short-latency signal in a wireless communication system according to the present invention, the number of the new symbols may be 16, and the CP length may be 250 ns.

In the method for generating a short-latency signal in a wireless communication system according to the present invention, the transmission may further include transmitting the situation report signal to a neighbor device already connected to the BS.

In the method for generating a short-latency signal in a wireless communication system according to the present invention, if the situation report signal is generated based on a predetermined emergency situation, the transmission of the situation report signal to the neighbor device may include transmitting the situation report signal to the neighbor device using a downlink transmission period.

In the method for generating a short-latency signal in a wireless communication system according to the present invention, the transmission of the situation report signal to the neighbor device using a downlink transmission period may include transmitting the situation report signal to the neighbor device in a predetermined symbol of each subframe within the downlink transmission period.

In the method for generating a short-latency signal in a wireless communication system according to the present invention, if the situation report signal is generated based on a predetermined emergency situation, the transmission may include transmitting the situation report signal by exclusively using one or more symbol periods of a subframe of the legacy communication system.

In the method for generating a short-latency signal in a wireless communication system according to the present invention, the situation report signal may be capable of using a parameter of the legacy system.

In another aspect of the present invention, a communication device for generating a situation report signal for short latency and transmitting the generated situation report signal to a BS in a wireless communication system includes a Radio Frequency (RF) unit including a transmitter and a receiver, and a processor connected to the transmitter and the receiver, for supporting communication. The processor controls generation of the situation report signal based on a predetermined specific situation perceived by the communication device, and transmission of the generated situation report signal to the BS. The situation report signal is generated to have a subcarrier spacing larger than a subcarrier spacing of a legacy communication system by a predetermined integer times.

In the communication device according to the present invention, the predetermined integer may be 16.

In the communication device according to the present invention, the processor may control generation of the situation report signal by including, in the situation report signal, one or more new symbols and a CP within one symbol period of the legacy communication system.

In the communication device according to the present invention, the processor may determine the number of the new symbols and a length of the CP based on the subcarrier spacing and a time-domain period of the situation report signal.

In the communication device according to the present invention, the number of the new symbols may be 16, and the CP length may be 250 ns.

In the communication device according to the present invention, the processor may control transmission of the situation report signal to a neighbor device already connected to the BS.

In the communication device according to the present invention, if the situation report signal is generated based on a predetermined emergency situation, the processor may control transmission of the situation report signal to the neighbor device using a downlink transmission period.

In the communication device according to the present invention, the processor may control transmission of the situation report signal to the neighbor device in a predetermined symbol of each subframe within the downlink transmission period.

In the communication device according to the present invention, if the situation report signal is generated based on a predetermined emergency situation, the processor may control transmission of the situation report signal by exclusively using one or more symbol periods of a subframe of the legacy communication system.

In the communication device according to the present invention, the situation report signal may be capable of using a parameter of the legacy system.

Advantageous Effects

According to the present invention, a short-latency signal can be generated in a wireless communication system.

According to the present invention, a short-latency signal having a subcarrier spacing larger than a subcarrier spacing of a legacy system by an integer times can be generated, and thus more time samples can be acquired. The resulting increase of the success probability of energy detection can reduce a latency.

According to the present invention, a short-latency signal that can reuse parameters of the legacy system can be generated. Therefore, the short-latency signal can also be used in the legacy system at the same time, while minimizing a change or an influence that might otherwise be caused.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

DESCRIPTION OF DRAWINGS

The accompanying drawings, which are included to provide a further understanding of the invention, illustrate embodiments of the invention and together with the description serve to explain the principle of the invention. However, the technical features of the present invention are not limited to the specific drawings, and a mew embodiment may be implemented by combining features illustrated in each drawing. In the drawings, reference numerals denote structural elements. In the drawings:

FIG. 3(a) is a diagram illustrating the architecture of control-plane radio interface protocols between a communication device and an evolved Node B (eNB) in a wireless communication system to which the present invention is applicable;

FIG. 3(b) is a diagram illustrating the architecture of user-plane radio interface protocols between the communication device and the eNB in the wireless communication system to which the present invention is applicable;

FIG. 7 is a diagram illustrating a signal flow for a contention-based random access procedure;

FIG. 8 is a diagram illustrating a signal flow for a non-contention-based random access procedure;

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide the full understanding of the present invention. However, it will be apparent to those skilled in the art that the present invention may be implemented without such specific details. For instance, although the following descriptions are made in detail on the assumption that a mobile communication system corresponds to 3GPP LTE system, they are applicable to other random mobile communication systems except unique features of the 3GPP LTE system.

Occasionally, to avoid obscuring the concept of the present invention, structures and/or devices known to the public may be skipped or represented as block diagrams centering on the core functions of the structures and/or devices.

In the present disclosure, when it is said that a part "comprises" or "has" a component, this signifies the presence of one or more other components, not excluding the presence of the one or more other components, unless otherwise specified.

Also, the term "–unit" means a unit of executing at least one function or operation. A unit may be achieved in hardware, software, or a combination of both. Further, "a or an", "one", and a similar related term may cover both singular and plural referents, unless otherwise specified or otherwise dictated by the context.

In addition, specific terms as used in embodiments of the present disclosure are provided to help understanding of the present invention. Unless otherwise defined, the terms and words including technical or scientific terms used in the following description and claims may have the same meanings as generally understood by those skilled in the art. The terms may be replaced with other terms without departing from the scope and spirit of the present invention.

The term as used in the present disclosure, first or second may be used to describe various components, not limiting the components. These expressions are used to distinguish one component from another component. For example, a first component may be referred to as a second component and vice versa without departing from the scope of the present disclosure.

Reference will now be made in detail to preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

Figure 1:
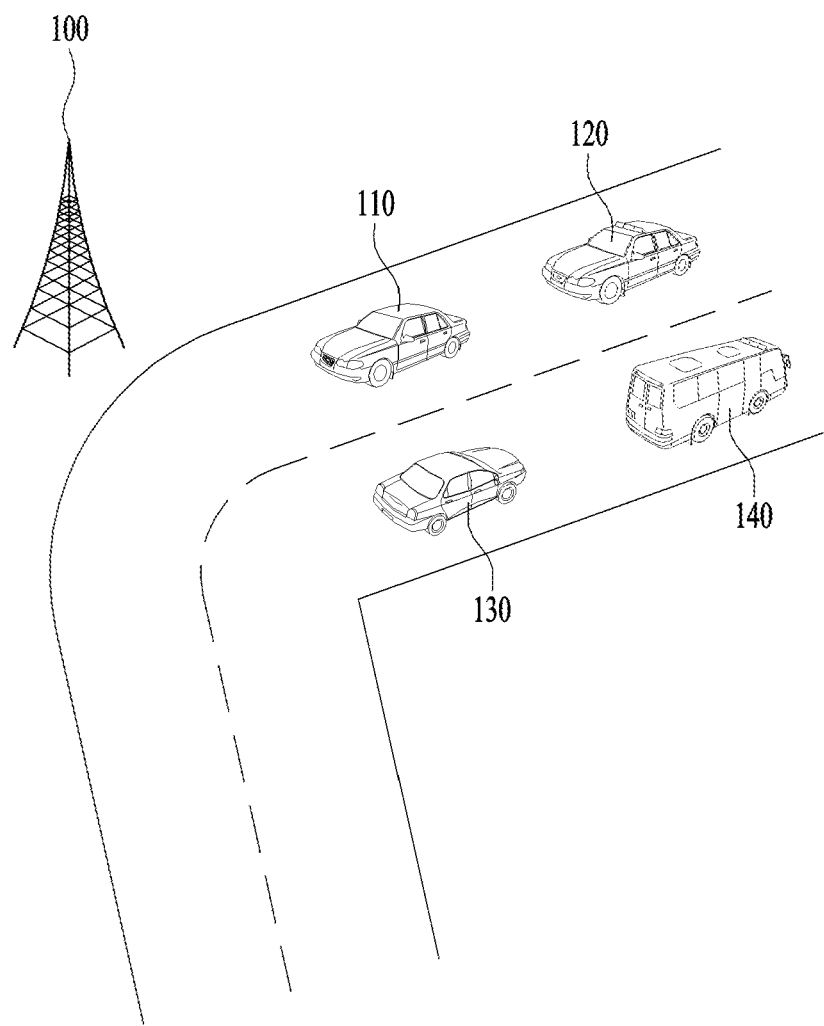
FIG. 1 is a diagram illustrating an exemplary communication environment between an in-vehicle communication device and a Base Station (BS) in a wireless communication system to which the present invention is applicable.

FIG. 1 is a diagram illustrating an exemplary communication environment between an in-vehicle communication device and a Base Station (BS) in a wireless communication system to which the present invention is applicable.

Referring to FIG. 1, the wireless communication system to which the present invention is applicable may include a BS 100 and one or more vehicles 110, 120, 130, and 140 each including a communication device.

For the convenience of description, the vehicles 110, 120, 130, and 140 each including a communication device will be defined as and referred to as communication devices in the present disclosure.

According to the present invention, the BS 100 is a terminal node of a network communicating directly with the communication devices 110, 120, 130, and 140. Also, a specific operation described as performed by the BS 100 may be performed by an upper node of the BS 100 under circumstances in the present invention.

Namely, it is apparent that, in a network comprised of a plurality of network nodes including the BS 100, various operations performed for communication with the communication devices 110, 120, 130, and 140 may be performed by the BS 100, or network nodes other than the BS 100.

In the present invention, the BS 100 may also be called a fixed station, a Node B, an evolved Node B (eNode B or eNB), an Access Point (AP), or the like.

The communication devices 110, 120, 130, and 140 may also be called terminals, Mobile Stations (MSs), Mobile Subscriber Stations (MSSs), Subscriber Stations (SSs), Advanced Mobile Stations (AMSs), Wireless Terminals (WTs), Machine-Type Communication (MTC) devices, Machine-to-Machine (M2M) devices, Device-to-Device (D2D) devices, or the like.

The embodiments of the present invention may be implemented by at least one of wireless communication systems including an Institute of Electrical and Electronics Engineers (IEEE) 802 system, a 3rd Generation Partnership Project (3GPP) system, a 3GPP Long Term Evolution (LTE) system, a 3GPP LTE-Advanced (LTE-A) system, and a 3GPP2 system, and supported by standard specifications disclosed for at least one of the wireless access systems.

Further, a legacy system is defined as an already defined system in the present invention. Accordingly, the 3GPP LTE system is a legacy system from the viewpoint of the 3GPP LTE-A system. For example, a legacy UE may be interpreted as a UE supported by the legacy system. According to the present invention, the legacy UE is conceptually included in a UE or a communication device, for the convenience of description.

The embodiments of the present invention may be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and so on.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE).

OFDMA may be implemented as a radio technology such as IEEE 802.11 (Wi-Fi), IEEE 802.16 (WiMAX), IEEE 802.20, Evolved UTRA (E-UTRA), etc. UTRA is a part of Universal Mobile Telecommunications System (UMTS). 3GPP LTE is a part of Evolved UMTS (E-UMTS) using E-UTRA, adopting OFDMA for Downlink (DL) and SC-FDMA for Uplink (UL). LTE-A is an evolution of 3GPP LTE.

In a wireless communication system, a communication device may receive information from an eNB on DL, and transmit information to the eNB on UL.

The information transmitted and received by the communication device includes data and various types of control information. There are many physical channels according to the types and usages of information transmitted or received by the communication device.

Figure 2:
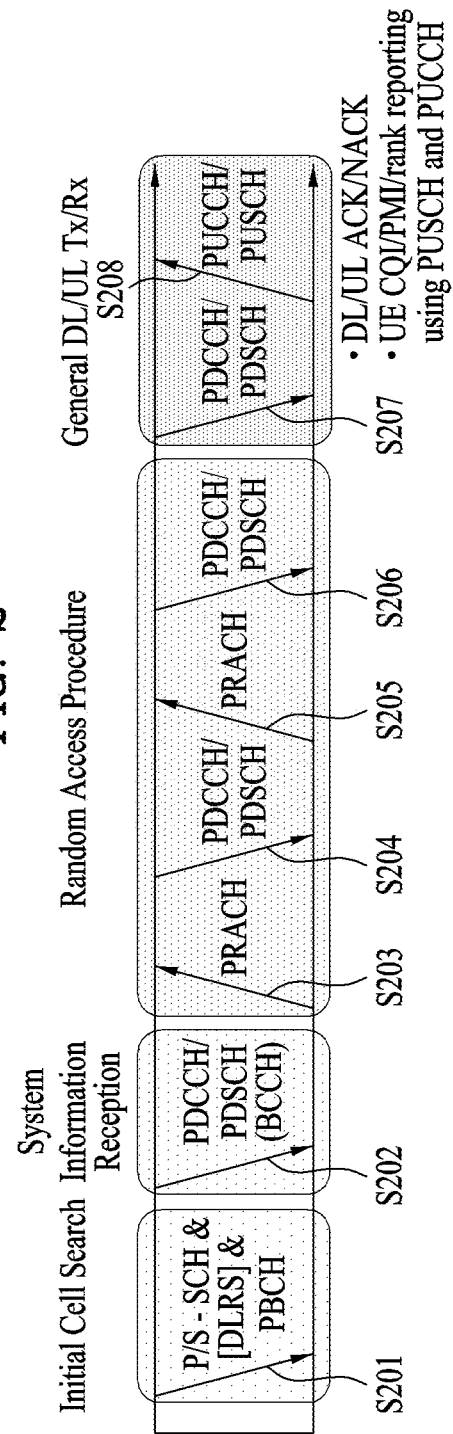
FIG. 2 is a diagram illustrating physical channels and a general signal transmission method using the physical channels in a $3^{rd}$ Generation Partnership Project (3GPP) Long Term Evolution (LTE) system to which the present invention is applicable.

FIG. 2 illustrates physical channels and a general signal transmission method using the physical channels, which are used in a 3GPP LTE system to which the present invention is applicable.

When a communication device is powered on or enters a new cell, the communication device performs initial cell search. The initial cell search involves acquisition of synchronization with an eNB (S201).

For this purpose, the communication device synchronizes its timing to the eNB and acquires information such as a cell Identifier (ID) by receiving a Primary Synchronization Channel (P-SCH) and a Secondary Synchronization Channel (S-SCH) from the eNB. Then, the communication device may acquire information broadcast in the cell by receiving a Physical Broadcast Channel (PBCH) from the eNB. During the initial cell search, the communication device may monitor a DL channel state by receiving a Downlink Reference Signal (DL RS).

After the initial cell search, the communication device may acquire more detailed system information by receiving a Physical Downlink Control Channel (PDCCH) and receiving a Physical Downlink Shared Channel (PDSCH) based on information of the PDCCH (S202).

Meanwhile, when the communication device initially accesses the eNB or has no radio resources for signal transmission, the communication device may perform a random access procedure with the eNB (S203 to S206).

As described later in detail with reference to FIGS. 7 and 8, to perform the random access procedure, the communication device may transmit a specific sequence as a preamble on a Physical Random Access Channel (PRACH) (S203), and may receive a response message to the preamble on a PDCCH and a PDSCH associated with the PDCCH (S204).

In the case of contention-based random access except for handover, the communication device may additionally perform a contention resolution procedure including transmission of an additional PRACH (S205) and reception of a PDCCH signal and a PDSCH signal corresponding to the PDCCH signal (S206).

After the above procedure, the communication device may receive a PDCCH and/or a PDSCH from the eNB (S207) and transmit a Physical Uplink Shared Channel (PUSCH) and/or a Physical Uplink Control Channel (PUCCH) to the eNB (S208), in a general UL/DL signal transmission procedure.

Control information that the communication device transmits to or receives from the eNB includes a DL/UL Acknowledgement/Negative Acknowledgement (ACK/NACK), a Channel Quality Indicator (CQI)/Precoding Matrix Index (PMI)/Rank Indicator (RI), and so on.

In the 3GPP LTE system, the communication device may transmit control information such as the above-described CQI/PMI/RI on a PUSCH and/or PUCCH.

FIGS. 3(a) and 3(b) illustrate a control-plane protocol stack and a user-plane protocol stack in a radio interface protocol architecture between a communication device and an eNB in a wireless communication system to which the present invention is applicable.

Referring to FIGS. 3(a) and 3(b), the radio interface protocol is divided horizontally into a physical layer, a data link layer, and a network layer, and vertically into a user plane for data transmission and a control plane for signaling.

The protocol layers of FIG. 3 can be divided into an L1 layer (first layer), an L2 layer (second layer), and an L3 layer (third layer) based on the lower three layers of the Open System Interconnection (OSI) reference model widely known in communication systems.

The control plane of FIG. 3(a) is a path in which the communication device and the network transmit control messages to manage calls, and the user plane of FIG. 3(b) is a path in which data generated from an application layer, for example, voice data or Internet packet data is transmitted. Now, a description will be given of each layer of the control plane and the user plane.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Meanwhile, data is transmitted on physical channels between the PHY layers of a transmitter and a receiver. The physical channels are modulated in OFDM and use time and frequency as radio resources.

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. In this case, the RLC layer may not exist. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets.

A Radio Resource Control (RRC) layer at the lowest part of Layer 3 (or L3) is defined only on the control plane. The RRC layer controls logical channels, transport channels, and physical channels in relation to configuration, reconfiguration, and release of Radio Bearers (RBs). An RB refers to a service provided at L2, for data transmission between the communication device and the network. For this purpose, the RRC layers of the communication device and the network exchange RRC messages with each other. If an RRC connection has been established between the RRC layers of the communication device and the network, the communication device is in RRC connected mode. Otherwise, the UE is in RRC idle mode.

A Non-Access Stratum (NAS) layer above the RRC layer performs functions such as session management, mobility management, etc.

A cell covered by an eNB is set to one of the bandwidths of 1.25, 2.5, 5, 10, and 20 MHz and provides DL or UL transmission service to a plurality of communication devices in the bandwidth. Different cells may be set to different bandwidths.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast or broadcast traffic or control messages may be transmitted on a DL SCH or a separately defined downlink Multicast Channel (MCH). UL transport channels used to deliver data from the communication device to the network include a Random Access Channel (RACH) carrying an initial control message and an uplink SCH carrying user traffic or a control message.

Logical channels that are defined above transport channels and mapped to transport channels include a Broadcast Control Channel (BCCH), a Paging Control Channel (PCCH), a Common Control Channel (CCCH), a Multicast Control Channel (MCCH), and a Multicast Traffic Channel (MTCH).

Figure 4:
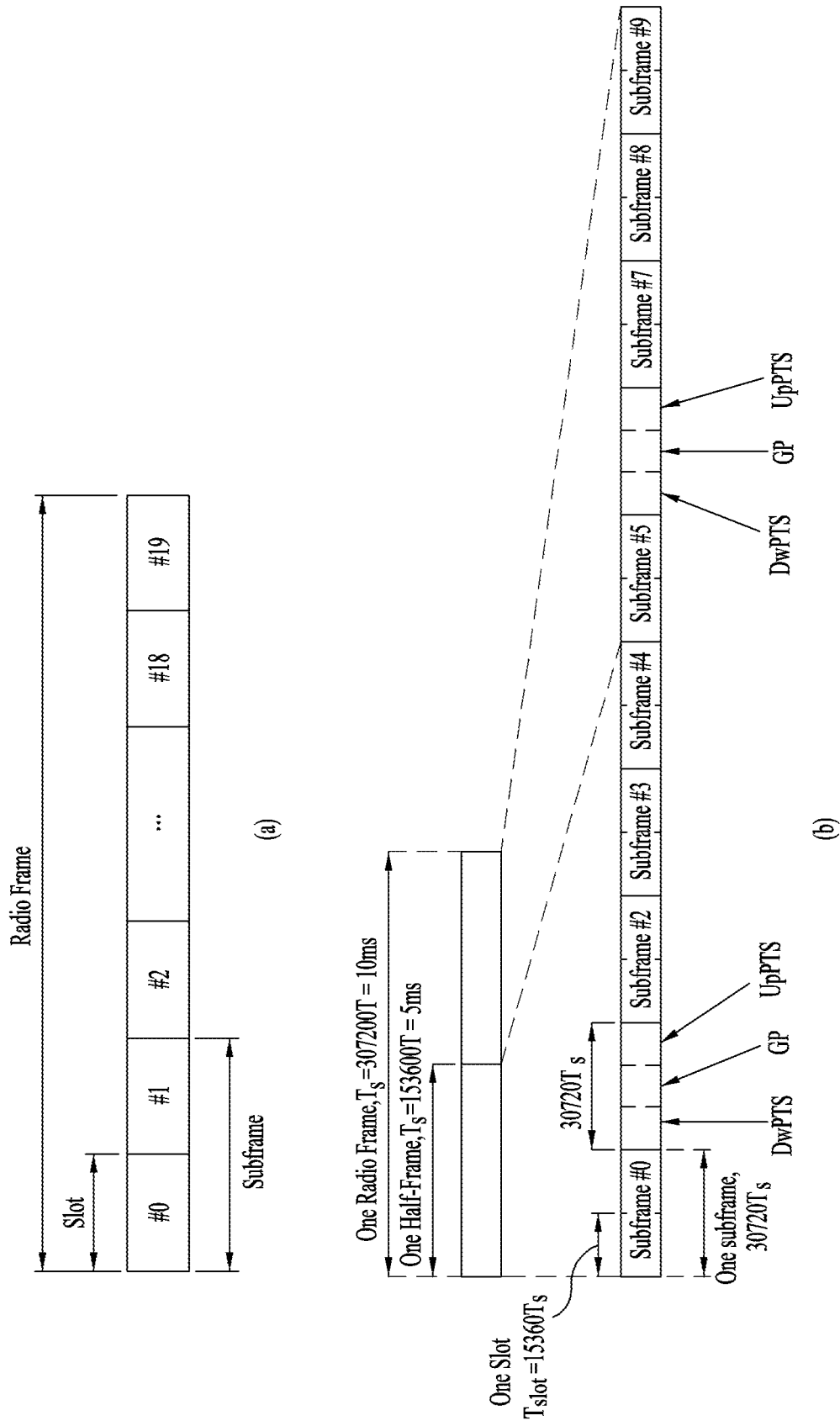
FIG. 4(a) is a diagram illustrating a downlink radio frame structure to which the present invention is applicable.
FIG. 4(b) is a diagram illustrating a downlink radio frame structure to which the present invention is applicable.

FIGS. 4(a) and 4(b) illustrates DL radio frame structures to which the present invention is applicable.

In a cellular OFDM radio packet communication system, UL/DL data packet transmission is performed in units of a subframe. One subframe is defined as a predetermined time period including a plurality of OFDM symbols.

In the 3GPP LTE standard, a frame structure supporting OFDMA and SC-FDMA transmission has been designed. The frame structures was so designed as to operate in a frequency band of 700 MHz to 6 GHz, and its main target frequency band is 2 GHz.

For the frame structure, an operating bandwidth is up to 20 MHz, an actual transmission bandwidth is 18 MHz, and a sampling frequency is set to 30.72 MHz. A null carrier is set in the remaining part between the transmission bandwidth and the sampling frequency. A subcarrier spacing is set to 15 kHz, and there are 1200 subcarriers for the transmission bandwidth.

In regard to time-domain parameters, a sampling time is determined to be the reciprocal 32.55208333 ns of the sampling frequency. That is, a time interval is set so that about 30,000 samples may be acquired within 1 ms. An OFDM symbol duration is determined to be the reciprocal 66.67 µs of the subcarrier spacing. A guard time is set to about 4 µs, and an OFDM symbol including a guard time is about 70 µs long.

[Table 1] and [Table 2] summarize the above description.

TABLE 1

| Frequency domain parameters | | Rel.8 LTE |
|---|---|---|
| Subcarrier spacing (kHz) | df | 15 |
| FFT size | Nfft | 2048 |
| Sampling Frequency (MHz) | Fs | 30.72 |
| Channel Bandwidth (MHz) | C-BW | 20 |
| Transmission Bandwidth (MHz) | T-BW | 18 |
| # of RE | Nre | 1200 |

TABLE 2

| Time domain parameters | | Rel.8 LTE |
|---|---|---|
| Sampling time (ns) | Ts = 1/Fs | 32.55208333 |
| # of samples in 1 ms | 1 (ms)/Ts (ns) | 30720 |
| OFDM duration (us) | Tu = 1/df | 66.66666667 |
| CP length (us) | Tcp | 4.6875 |
| CP overhead (%) | Tcp/(Tcp + Tu) | 6.569343066 |
| OFDM symbol (us) | Tofdm | 71.35416667 |

Meanwhile, the frame structure designed to support OFDMA and SC-FDMA transmission in the 3GPP LTE standard may include a type 1 radio frame structure applicable to Frequency Division Duplexing (FDD), illustrated in FIG. 4(a) and a type 2 radio frame structure applicable to Time Division Duplexing (TDD), illustrated in FIG. 4(b).

Referring to FIG. 4(a) first, a DL radio frame includes 10 subframes, each subframe including two slots in the time domain.

A time required for transmitting one subframe is defined as a Transmission Time Interval (TTI), and a TTI is defined in units of a basic resource allocation unit for data transmission. Accordingly, a TTI is set to 1 ms, and called a subframe. One subframe may include 14 or 12 OFDM symbols according to the Cyclic Prefix (CP) length of the OFDM symbols.

For example, one subframe may be 1 ms long and one slot may be 0.5 ms long. One slot may include a plurality of OFDM symbols in the time domain and a plurality of Resource Blocks (RBs) in the frequency domain.

Since the 3GPP LTE system uses OFDMA in DL, an OFDM symbol represents one symbol interval. An OFDM symbol may also be called an SC-FDMA symbol or a symbol interval. An RB is a resource allocation unit and includes a plurality of contiguous subcarriers in one slot.

The number of OFDM symbols included in one slot may vary according to a CP configuration. There are an extended CP and a normal CP. For example, if the OFDM symbols are configured with the normal CP, one slot may include seven OFDM symbols. On the other hand, if the OFDM symbols are configured with the extended CP, the length of one OFDM symbol is increased and thus one slot includes fewer OFDM symbols than a slot with the normal CP. In case of the extended CP, for example, the number of OFDM symbols included in one slot may be 6. If a channel state is unstable, as is the case with a User Equipment (UE) moving fast, the extended CP may be used in order to further reduce inter-symbol interference.

In case of the normal CP, one slot includes seven OFDM symbols, and thus one subframe includes 14 OFDM symbols. Then, the first two or three OFDM symbols of each subframe may be allocated to a PDCCH, and the remaining OFDM symbols may be allocated to a PDSCH. In the case of the extended CP, one slot includes six OFDM symbols and thus one subframe includes 12 OFDM symbols.

Referring to FIG. 4(b), a type 2 radio frame includes two half-frames, each including five subframes, a downlink pilot time slot (DwPTS), a guard period (GP), and an uplink pilot time slot (UpPTS), and one subframe includes two slots.

The DwPTS is used for initial cell search, synchronization, or channel estimation. The UpPTS is used for channel estimation and UL transmission synchronization with a UE at an eNB. The GP cancels interference caused in UL by multi-path delay of a DL signal. Meanwhile, one subframe includes two slots irrespective of the radio frame types.

A DL synchronization signal is transmitted in two OFDM symbols, every 5 ms. If one OFDM symbol is 70 μs long, the DL synchronization signal is transmitted for 140 μs, with a periodicity of 5 ms.

The DL synchronization signal uses 72 subcarriers of a center frequency, and 10 out of the 72 subcarriers are used as a null carrier.

However, the afore-described radio frame structures are purely exemplary. Accordingly, the number of subframes per radio frame, the number of slots per subframe, and the number of symbols per slot may be changed in various manners.

Figure 5:
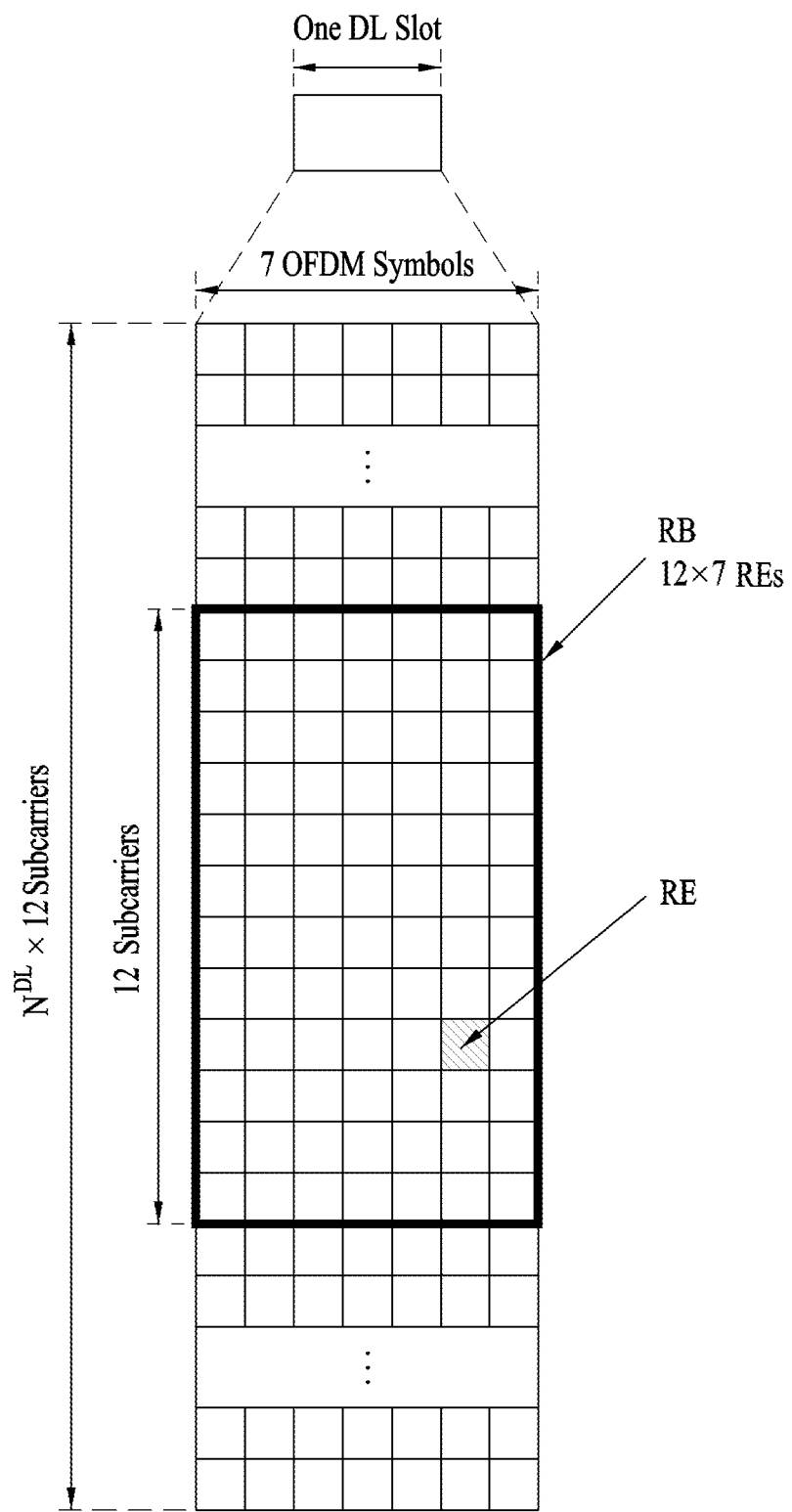
FIG. 5 is a diagram illustrating an exemplary downlink slot defined by symbols and subcarriers.

FIG. 5 illustrates an exemplary DL slot including symbols and subcarriers.

Referring to FIG. 5, each OFDM symbol is configured to include a normal CP, and a DL slot includes a plurality of OFDM symbols in the time domain and a plurality of RBs in the frequency domain.

While it is described by way of example that one DL slot includes 7 OFDM symbols and one RB includes 12 subcarriers, the present invention is not limited thereto.

Each element in the resource grid of FIG. 5 is referred to as a Resource Element (RE). For example, RE a(k,l) represents an RE located at a $k^{th}$ subcarrier in an $l^{th}$ OFDM symbol. In the normal CP case, one RB includes 12×7 REs (in the extended CP case, one RB includes 12×6 REs). Since a subcarrier spacing is 15 kHz, one RB is about 180 kHz in the frequency domain. $N^{DL}$ represents the number of RBs, and may be determined according to a DL transmission bandwidth configured by eNB scheduling.

Figure 6:
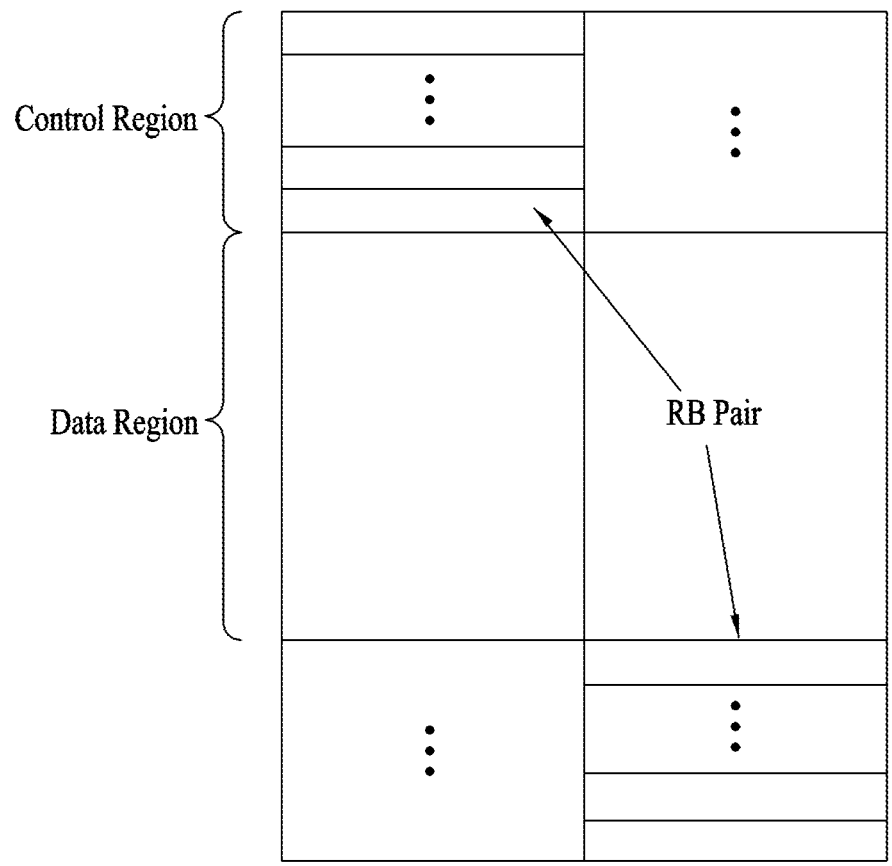
FIG. 6 is a diagram illustrating an uplink subframe structure to which the present invention is applicable.

FIG. 6 illustrates a UL subframe structure to which the present invention is applicable.

Basically, a frame for UL data transmission has the same configuration as a DL frame. However, the UL frame differs from the DL frame in terms of the positions of signals or channels included in the frame (also in terms of bandwidth, subcarrier spacing, subframe length, and so on). UL channels include a data channel, a control channel, a Data Demodulation Reference Signal (DMRS), a Channel State Information Reference Signal (CSI-RS), and an RACH.

The DMRS is transmitted across two OFDM symbols in a subframe, and the CSI-RS is transmitted in the last OFDM symbol of the subframe.

The RACH is multiplexed with the data channel and the control channel in time and frequency. Time-frequency resources are allocated in a data channel region and repeated periodically.

Referring to FIG. 6, a UL subframe may be divided into a control region and a data region in the frequency domain. A PUCCH carrying Uplink Control Information (UCI) is allocated to the control region.

A PUSCH carrying user data is allocated to the data region. To maintain the property of a single carrier, a UE does not transmit a PUSCH and a PUCCH simultaneously.

A PUCCH for a UE is allocated to an RB pair in a subframe. The RBs of the RB pair occupy different subcarriers in two slots. Thus it is said that the RB pair allocated to the PUCCH is frequency-hopped over a slot boundary.

FIGS. 7 and 8 illustrate an exemplary contention-based random access procedure and an exemplary non-contention-based random access procedure, respectively.

Referring to FIGS. 7 and 8, FIG. 7 illustrates a contention-based random access procedure, and FIG. 8 illustrates a non-contention-based random access procedure. That is, random access procedures may be divided into the contention-based random access procedure and the non-contention-based random access procedure.

In the contention-based random access procedure, a communication device 100 randomly selects a random access preamble to access a BS 200.

Therefore, a plurality of communication devices may select the same random access preamble and transmit the random access preamble simultaneously to the eNB. That's why contention resolution is needed later.

In contrast, according to the non-contention-based random access procedure as illustrated in FIG. 8, the BS 200 performs a random access procedure using a random access preamble uniquely allocated to the communication device 100. Therefore, the communication device 100 may perform the random access procedure without colliding with other communication devices.

That is, the biggest difference between the contention-based random access procedure and the non-contention-based random access procedure lies in that a random access preamble is or is not dedicated to one communication device.

In the non-contention-based random access procedure, since a communication device uses a dedicated random access preamble allocated to it, the communication device does not contend (or collide) with another communication device. On the other hand, in the contention-based random access procedure, a communication device is likely to contend with another communication device because the communication device uses a random access preamble randomly selected from among one or more random access preambles.

Herein, contention refers to attempting a random access procedure using the same random access preamble in the same resources by two or more communication devices.

With reference to FIG. 7 again, operations of a communication device and an eNB in the contention-based random access procedure will be described below in detail.

(1) Transmission of First Message (S701)

First, the communication device may select a random access preamble randomly from a set of random access preambles indicated by system information or a Handover Command, select PRACH resources, and transmit the selected random access preamble in the selected PRACH resources (S701).

(2) Reception of Second Message (S702)

After transmitting the random access preamble in step S701, the communication device attempts to receive its random access response within a random access response reception window indicated in the system information or the Handover Command by the eNB (S702).

More specifically, random access response information may be transmitted in a Medium Access Control Packet Data Unit (MAC PDU), and the MAC PDU may be transmitted on a PDSCH. To receive information on the PDSCH successfully, the communication device preferably monitors a PDCCH.

That is, the PDCCH preferably carries information about a communication device to receive the PDSCH, information about time and frequency resources of the PDSCH, and the transport format of the PDSCH.

Once the communication device succeeds in receiving the PDCCH directed to it, the communication device may receive a random access response normally on the PDSCH based on information of the PDCCH. The random access response may include a Random Access Preamble Identifier (RAPID), a UL Grant indicating UL radio resources, a temporary Cell Radio Network Temporary Identifier (C-RNTI), and a Time Advance Command (TAC).

The reason for including the RAPID in the random access response is to indicate a communication device to which the UL Grant, the temporary C-RNTI, and the TAC are valid because one random access response may include random access preamble information for one or more communication devices.

It is assumed that the communication device selects an RAPID matching its selected random access preamble in step S702. Thus, the communication device is capable of receiving the UL grant, the temporary C-RNTI, and the TAC in the random access preamble response.

(3) Transmission of Third Message (S703)

Upon receipt of the random access response valid to the communication device, the communication device processes the information included in the random access preamble separately. That is, the communication device applies the TAC and stores the temporary C-RNTI. In addition, the communication device may store data to be transmitted in response to reception of the valid random access response in a third buffer.

Meanwhile, the communication device transmits data (i.e. a third message) to the eNB based on the received UL Grant (S703).

The third message should include an ID of the communication device. In the contention-based random access procedure, although the eNB may not identify communication devices that perform the random access procedure, the eNB needs to identify the communication devices for subsequent contention resolution.

Inclusion of the ID of the communication device in the data is considered in two methods. In one method, if the communication device has a valid cell ID that has been allocated by the cell before the random access procedure, the communication device transmits the cell ID in a UL signal based on the UL Grant. On the other hand, if the communication device does not have a valid cell ID allocated before the random access procedure, the communication device transmits its unique ID (e.g. System Architecture Evolution-Temporary Mobile Subscriber Identity (S-TMSI) or Random ID).

In general, the unique ID is longer than the cell ID. If the communication device has transmitted the data based on the UL Grant, the UE starts a Contention Resolution (CR) timer.

(4) Reception of Fourth Message (S704)

After transmitting the data including its ID based on the UL Grant included in the random access response, the communication device awaits reception of a command for contention resolution from the eNB. That is, the communication device attempts PDCCH reception in order to receive a specific message (S704).

The communication device may receive a PDCCH in two methods. As described before, if a third message including a cell ID has been transmitted in response to the UL Grant, the communication device attempts to receive a PDCCH using its cell ID. If a third message including the unique ID of the communication device has been transmitted in response to the UL Grant, the communication device attempts to receive a PDCCH using the temporary C-RNTI included in the random access response.

In the former case, upon receipt of a PDCCH using the cell ID before expiration of the CR timer, the communication device ends the random access procedure, considering that the random access procedure has been completed successfully.

In the latter case, upon receipt of a PDCCH using the temporary C-RNTI before expiration of the CR timer, the communication device checks data delivered on a PDSCH indicated by the PDCCH. If the data includes the unique ID, the communication device ends the random access procedure, considering that the random access procedure has been completed successfully.

Meanwhile, if the contention resolution based on transmission of the third message and reception of the fourth message is not successful, the communication device may restart the random access procedure by selecting another random access preamble. Accordingly, the communication device may receive a second message from the eNB, configure a third message for contention resolution, and transmit the third message to the eNB.

Meanwhile, referring to FIG. 8, compared to the contention-based random access procedure illustrated in FIG. 7, the BS 200 allocates a dedicated random access preamble to the communication device 100 (S801).

The communication device 100 transmits the random access preamble allocated by the BS 200 in step S801 to the eNB, with initial transmission power or retransmission power determined in the same manner as described before with reference to FIG. 7 in the random access procedure (S802).

Therefore, the communication device may perform the random access procedure without colliding with another communication device, compared to the contention-based random access procedure described with reference to FIG. 7.

If the communication device 100 receives from the BS 200 a random access response message in response to the random access preamble transmitted in step S802, a connection is established between the communication device 100 and the BS 200 (S803).

Figure 9:
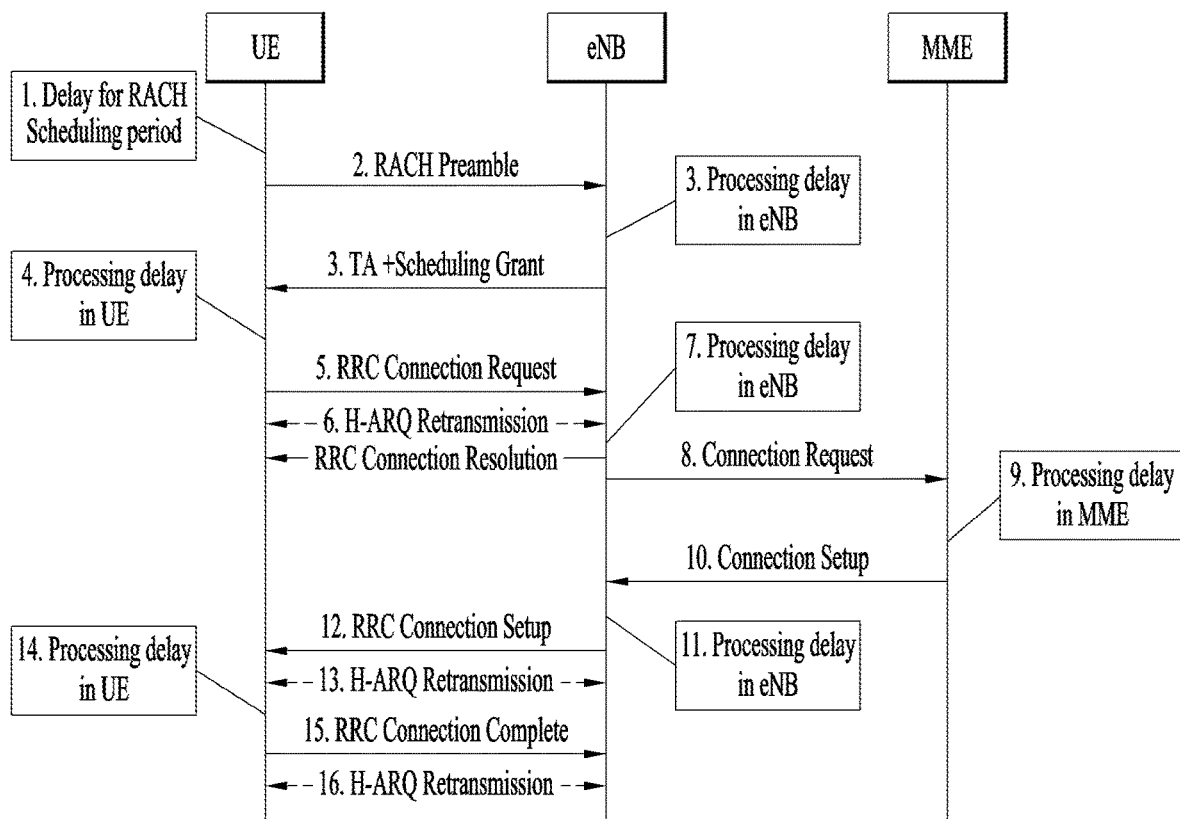
FIG. 9 is a diagram illustrating the concept of latency in the 3GPP LTE system to which the present invention is applicable.

FIG. 9 is a diagram illustrating the concept of latency in a 3GPP LTE system to which the present invention is applicable.

As described before, to support a service requiring real-time information sharing and control based on information sharing between objects in a wireless communication system, initial access should be performed at each communication. Due to the resulting increase of latency caused by the initial access, there is a need for a short-latency technique.

Main services requiring such a short-latency technique include on-line gaming, M2M gaming, sensor-based alarm, remote control, and so on. The short-latency technique is also required for an Intelligent Transport System (ITS) service to which especially sensor-based alarm and remote control techniques having strict requirements for short latency are mapped.

In the current ITS standard, initial access is performed at each communication for information sharing, thereby causing most latency.

If the LTE technology is applied to a service including the ITS or the like, a latency involved in the initial access is about 100 ms. More specifically, if the delays of the user plane and the control plane in FDD are included, a latency of about 66 to 106 ms occurs.

More specifically, FIG. 9 illustrates initial access-incurred latency in the case where the LTE technology is applied to a main service requiring a short-latency technique including the ITS. As illustrated in FIG. 9, the initial access-incurred latency may take place in many parts.

As illustrated in FIG. 9, the initial access-incurred latency includes a delay for RACH scheduling, a processing delay for scheduling grant allocation of an eNB, and a processing delay for RRC connection setup on the side of a communication device including a UE, whereas the initial access-incurred latency includes a processing delay for processing an RACH preamble received from the UE, a processing delay for processing an RRC connection request, and a processing delay for connection setup with a Mobility Management Entity (MME) on the side of the eNB. There is a processing delay for a connection request received from the eNB on the side of the MME. All these delays may be included in the initial access-incurred latency.

The initial access-incurred latency may be divided into user-plane latency and control-plane latency.

Figure 10:
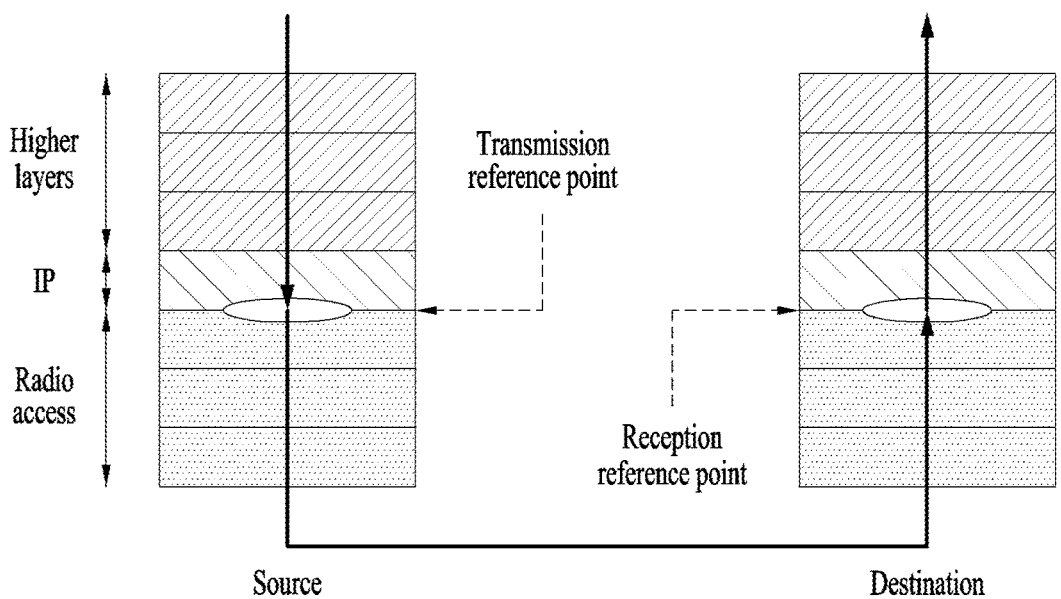
FIG. 10 is a diagram illustrating the concept of control-plane latency in the architecture of radio interface protocols between a communication device and an eNB.

As illustrated in FIG. 10, the user-plane latency is a latency that may be produced in relation to data transmission, in the state where a connection has been established between a source being a data transmission entity and a destination being a data reception entity. The user-plane latency may include a UE processing delay including header compression, ciphering, and RLC/MAC processing, a resource allocation and physical layer transmission delay (L1 processing and TTI subframe alignment at the transmitter and the receiver), an HARQ retransmission delay, an eNB processing delay, a delay on an S1 interface between an eNB and a Serving Gateway (S-GW), and a processing delay of the S-GW.

Figure 11:
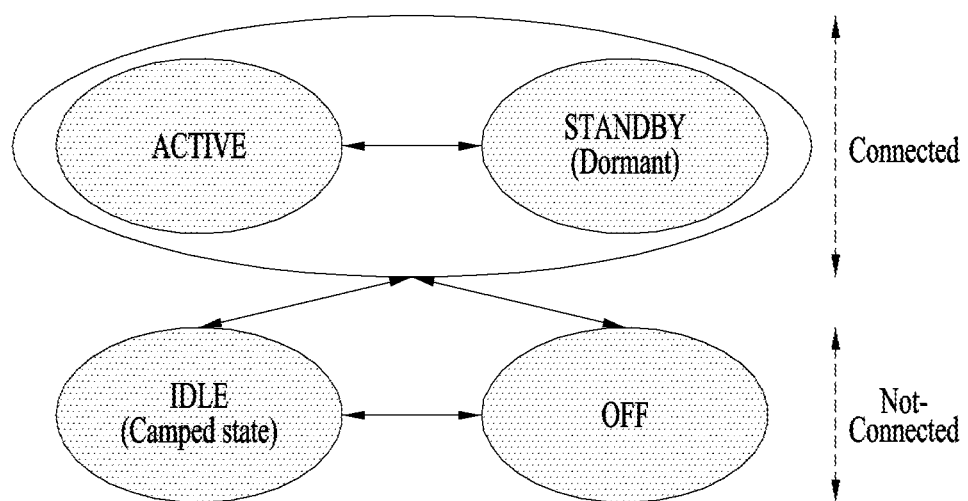
FIG. 11 is a diagram illustrating the concept of user-plane latency in the architecture of radio interface protocols between a communication device and an eNB.

As illustrated in FIG. 11, the control-plane latency refers to a latency that may occur when a communication device transitions from an idle state to an active state (a connection setup latency). The control-plane latency may include L1, L2, and L3 procedures of the eNB and the communication device, a transmission delay, and retransmission for reliable transfer.

However, an actual delay of a system may be dependent on system load and radio propagation conditions.

Meanwhile, if the LTE technology is applied to a service including the ITS as described before, the initial access-incurred latency is about 100 ms. In FDD, if a user-plane delay (2 to 15 ms) and a control-plane delay (1 to 15 ms) are included, the initial access-incurred latency is about 66 to 106 ms.

However, if the afore-described V2I and V2V technologies are applied in this case, the latency is decreased to about 20 ms, which will be described in detail with reference to [Table 3] below.

TABLE 3

| Delay component | Delay value |
| --- | --- |
| UL + DL transmission time | 2 ms |
| Buffering time (0.5 × transmission time) | 2 × 0.5 × 1 ms = 1 ms |
| Retransmission 10% | 2 × 0.1 × 8 ms = 1.6 ms |
| UL scheduling request | 0.5 × 5 ms = 2.5 ms |
| UL scheduling grant | 4 ms |
| Evaluated communication device delay | 4 ms |
| Evaluated eNB delay | 4 ms |
| Core network | 1 ms |

As noted from [Table 3], in the case where the V2I and V2V technologies are applied, if resource scheduling is performed, the latency may be reduced to 20.1 ms (about 20 ms). If resources to be used are predetermined, a delay caused by a UL scheduling request and grant may be excluded. As a consequence, the latency may be reduced to 13.6 ms.

That is, a speed of perceiving a situation such as an imminent collision or traffic congestion is about 20 ms in a service including the ITS that recognizes a situation in real time. In other words, it may be judged that a communication speed for safety driving that enables a vehicle to avoid an imminent collision is not ensured with the technology of up to $4^{th}$ Generation (4G).

Therefore, a $5^{th}$ Generation (5G) network to which the present invention is applicable seeks to decrease the real-time situation perception speed to $\frac{1}{1000}$ (about 0.1 ms), including a time taken for the communication device to perceive a specific situation and transmit information about the situation to the eNB (the network, and so on) so that the eNB may perceive the situation.

An exemplary method for generating a short-latency signal in a wireless communication system according to the present invention proposed in this context will be described in detail with reference to FIG. 12.

Figure 12:
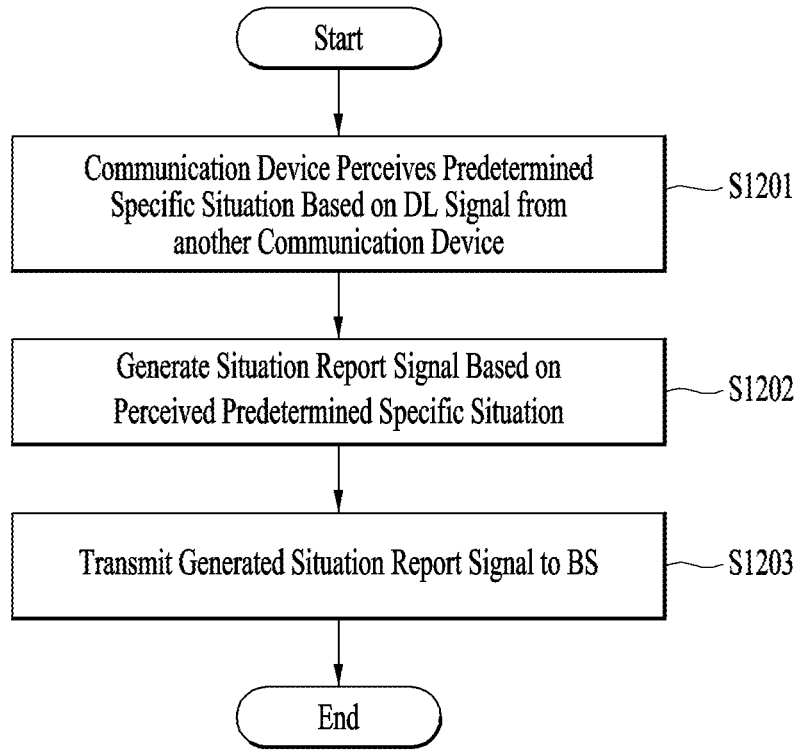
FIG. 12 is a flowchart illustrating a method for generating a short-latency signal in a wireless communication system according to an embodiment of the present invention.

FIG. 12 is an exemplary flowchart illustrating a method for generating a short-latency signal in a wireless communication system according to an embodiment of the present invention.

In general, a procedure for perceiving a predetermined situation and reporting the situation to an eNB (a network, and so one) by a communication device so that the eNB may perceive the situation may be performed as follows.

1) A first communication device transmits a signal indicating a situation. 2) Upon detection of the signal, a second communication device perceives the situation. 3) The second communication device then transmits a situation report signal to an eNB. 4) Finally, the eNB perceives the situation.

On the assumption that the LTE technology is introduced to the procedure, the first communication device transmits a DL synchronization signal, and upon detection of the DL synchronization signal, the second communication device perceives a corresponding situation and transmits a PRACH or Sounding Reference Signal (SRS) to report the situation to the eNB. The eNB perceives the situation by receiving the PRACH or SRS.

If a latency that may occur in the above procedure is calculated, at least about 140 µs (one symbol (70 µs) of a DL synchronization signal and one symbol (70 µs) of a UL RS) is taken for the signal transmission. Considering a processing delay (detection and transmission preparation) of the communication device and a time taken for the eNB to receive the signal and perceive the situation based on the signal, the latency is further increased. If a collision situation is assumed, the increase of false alarms caused by detection errors decreases overall reliability of the system as well as increases the latency.

Accordingly, since a new transmission method and a new signal design are required to satisfy a latency within 0.1 ms mentioned before with reference with FIG. 11, the present invention proposes a method for generating a short-latency signal in a wireless communication system.

Referring to FIG. 12, a communication device in the wireless communication system may receive a DL signal from another communication device, and perceive a predetermined specific situation based on the received DL signal (S1201).

The specific situation means a situation that may be predefined, including an emergency such as an urgent accident.

Meanwhile, upon perception of the predetermined specific situation, the communication device may generate a situation report signal based on the perceived situation (S1202).

The feature of the present invention for satisfying a latency of 0.1 ms or shorter as described before may be applied in generating the situation report signal.

More specifically, the method for generating a short-latency signal in a wireless communication system according to the present invention is based on the assumption that a symbol duration satisfies the following two conditions.

First, an OFDM symbol of 5 µs or shorter is generated.

Second, an OFDM symbol is generated to be compatible (or duality) with a legacy system.

The IEEE 802.11 physical layer is designed to have a transmission bandwidth of 20 MHz and 300-kHz subcarriers. In the IEEE 802.11 physical layer, an OFDM symbol has a symbol duration of 4 µs and includes a total of 64 time samples.

If more time samples can be secured, the success probability of energy detection may be increased. If a sampling time is set to be shorter, more time samples may be secured.

Therefore, in order to satisfy the first of the two symbol duration conditions, that is, the condition that an OFDM symbol of 5 µs or shorter is generated, it is necessary to set a subcarrier spacing to be 300 kHz or larger, and to set a sampling time to result in 64 or more time samples in the method for generating a short-latency signal in a wireless communication system according to the present invention.

Besides, if compatibility with the legacy system is achieved as provided in the second of the two symbol duration conditions, lots of parameters of the legacy system may be reused.

As described before, the 3GPP LTE frame is designed to have a subcarrier spacing of 15 kH or 30 kHz, and a sampling frequency of 30.72 MHz. A sampling time is the reciprocal of the sampling frequency, thus 32.55208333 ns.

In the method for generating a short-latency signal in a wireless communication system according to the present invention, the subcarrier spacing is set to 240 kHz larger than the conventional subcarrier spacing 15 kHz or 30 kHz, so that the OFDM symbol duration is equal to or less than 5 µs.

In this case, the signal has a period of 4.16 µs in the time domain. For the conventional 15-kHz subcarrier spacing, one period is 66.67 µs in the time domain. Given a subcarrier spacing of 240 kHz as in the present invention, an about $\frac{1}{16}$-times shorter spacing corresponds to one period, which is a time during which new 16 OFDM symbols may be included within the conventional OFDM symbol duration.

Also, if a new OFDM symbol is designed to have a CP of about 250 ns, 16 new OFDM symbols may be included in the conventional one OFDM symbol period.

In other words, the situation report signal may be generated by including one or more new symbols and CPs in one symbol period of the legacy communication system in step S1201. The number of the new symbols and the CP length may be determined in consideration of the subcarrier spacing and time-domain period of the situation report signal.

For example, the number of the new symbols may be determined to be 16, and the CP length may be determined to be 250 ns. These values are determined in consideration of the subcarrier spacing of 240 kHz and the time-domain period 4.16 ns of the situation report signal.

In addition, if the situation report signal is designed to be compatible with the 3GPP LTE system as a legacy system, a great part of channels and transmission methods defined in the 3GPP LTE system may be reused in the same frequency band as that of the 3GPP LTE system. Above all things, if a sampling rate is matched, the computation complexity of hardware may be reduced.

Accordingly, if the situation report signal is designed as described above according to the present invention, the wireless communication may operate compatibly with the legacy system at the same time, while minimizing the effect on the legacy system. For example, a part of the OFDM symbols of the conventional subframe may readily be used exclusively for new OFDM symbols.

Meanwhile, a time period of the legacy system may be allocated for an operation of the new system in the method for generating a short-latency signal in a wireless communication system according to the present invention.

Specifically, if various configuration parameters of the legacy system are reused and new OFDM symbols are arranged in the conventional OFDM symbol period, as described before, specific OFDM symbols of the legacy system may be readily configured as a resource allocation period of new OFDM symbols.

In the legacy system, a subframe includes 14 or 12 OFDM symbols according to a CP length. A PDCCH transmission period spans from OFDM symbol 1 to OFDM symbol 4, and a PDSCH transmission period spans from OFDM symbol 2 to OFDM symbol 14 in a DL subframe. CRSs are transmitted in OFDM symbols 1, 2, 5, 8, 9, and 12, and DMRSs are transmitted in OFDM symbols 6, 7, 13, and 14. A PSS and an SSS are transmitted every 5 ms, in OFDM symbols 6 and 7. A PBCH is transmitted every 10 ms, in OFDM symbols 8, 9, 10, and 11.

If an OFDM symbol is to be used exclusively with minimal impact on the legacy system, a period other than a period used for transmission of significant information (ACK/NACK, a synchronization signal, system information, and so one) may be selected. For example, OFDM symbol 12 may be exclusively used.

However, according to an embodiment of the present invention, if a notification is to be transmitted in a predetermined specific situation such as a traffic accident, any OFDM symbol period of a subframe may be used exclusively as a time period for transmission of new OFDM symbols.

That is, if the situation report signal is generated based on the predetermined specific situation, the situation report signal may be transmitted exclusively in any one or more OFDM symbols of a subframe of the legacy communication system.

Referring to FIG. 12 again, the communication device may transmit the situation report signal generated in the afore-described method to the eNB (S1203). While not shown in FIG. 12, the communication device may also transmit the situation report signal to a neighbor device (another communication device or the like) connected to the eNB.

A frequency band for communication between a communication device and an eNB (device-to-infrastructure communication) is generally configured in a UL carrier or in a UL subframe. Also, a frequency band for communication between communication devices (D2D communication) is configured in a UL carrier or in a UL subframe.

However, the situation report signal may be transmitted in both a DL carrier and a UL carrier or both a DL subframe and a UL subframe according to the situation of the signal in the present invention.

That is, if the situation report signal is generated based on the predetermined specific situation, the situation report signal may be transmitted to the neighbor device (another communication device or the like) during a DL transmission period as well as during a UL transmission period.

For example, if the situation report signal is configured to use a DL carrier or a DL subframe even for communication between communication devices in a situation where an accident vehicle is discovered and notified or in an emergency situation, the situation report signal may be transmitted in a DL carrier or a DL subframe.

More specifically, if it is assumed that every communication device is connected to an eNB, the communication device acquires system information and grant information for data transmission from the eNB by receiving a DL signal from the eNB. For this purpose, the communication device continuously performs a DL reception operation.

On the other hand, if a UL carrier or a UL subframe is allocated for communication between communication devices, the communication device listens a signal during a UL period, only in a specific situation.

Therefore, if an emergency signal is to be transmitted to communication devices, a DL transmission period in which the communication devices generally receive signals may be used, thereby increasing the success probability of signal transmission, as in the embodiment of the present invention.

However, if a DL transmission period is used unconditionally, the signal transmission in the DL transmission period may affect the legacy system. Therefore, if a DL transmission period is exclusively used, when to start and discontinue transmission may be set in the present invention.

That is, transmission to a neighbor device (another communication device or the like) during the DL transmission period may be performed in a predetermined specific symbol of each subframe within the DL transmission period.

For example, the situation report signal may be transmitted by exclusive using a small number of OFDM symbols of a subframe and then the transmission may be discontinued. Subsequently, the situation report signal may be transmitted in the next subframe, using only the small number of OFDM symbols.

Further, it is assumed that a few classes of signals are predetermined so that various situations may be recognized immediately just by signal detection in the method for generating a short-latency signal in a wireless communication system according to the present invention. The classes of signals may be determined according to transmission power, symbol durations, transmission periods, and the like.

Figure 13:
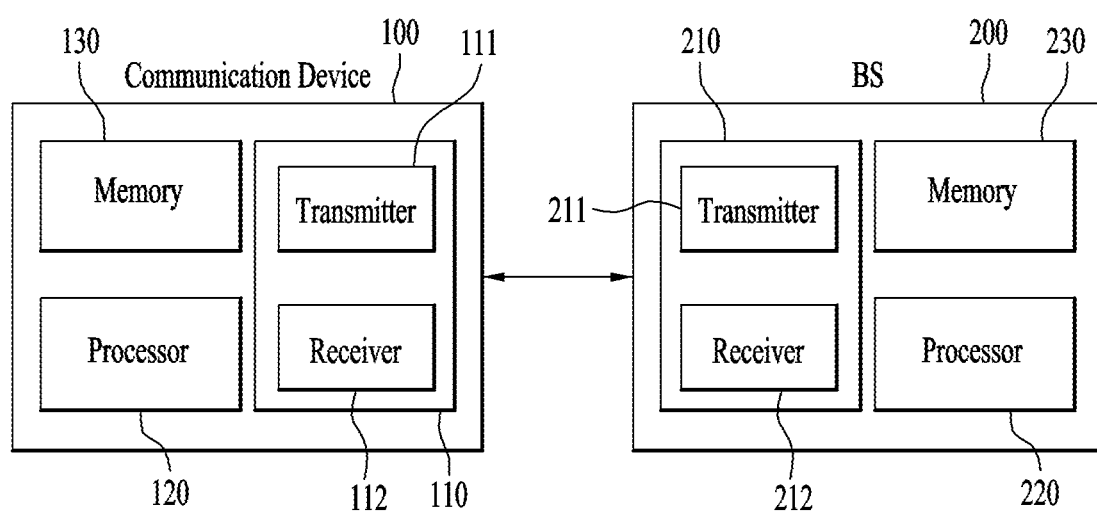
FIG. 13 is a block diagram of an apparatus for generating a short-latency signal in a wireless communication system according to an embodiment of the present invention.

FIG. 13 is a block diagram of an apparatus for generating a short-latency signal in a wireless communication system according to an embodiment of the present invention.

While a one-to-one communication environment between the communication device 100 and the BS 200 is shown in FIG. 13, a communication environment may be built between a plurality of communication devices or between a plurality of communication devices and a BS.

In FIG. 13, the communication device 100 may include a Radio Frequency (RF) unit 110 with a transmitter 111 and a receiver 112, a processor 120, and a memory 130.

The processor 120 and the memory 130 control overall communication operations including signal processing, layer processing, and so on. Further, the RF unit 110, the processor 120, and the memory 130 may be connected to one another.

The RF unit 110 of the communication device 100 may include the transmitter 111 and the receiver 112. The transmitter 111 and the receiver 112 may be configured to transmit signals to and receive signals from the BS 200 or other devices.

The processor 120 may be configured to be operatively connected to the transmitter 111 and the receiver 112 of the RF unit 110 and control signal transmission and reception of the transmitter 111 and the receiver 112 to and from the BS 200 and other devices. Also, the processor 120 may subject a transmission signal to various processes and transmit the processed signal to the transmitter 111, and may process a signal received through the receiver 112.

When needed, the processor 120 may store information included in an exchanged message in the memory 130. The communication device 100 having the above-described configuration may perform the afore-described methods according to various embodiments of the present invention.

An RF unit 210 including a transmitter 211 and a receiver 212 in the BS 200 is configured to transmit signals to and receive signals from the communication device 100. A process 220 of the BS 200 may be configured to be operatively connected to the transmitter 211 and the receiver 212 and control signal transmission and reception of the transmitter 211 and the receiver 212 to and from other devices including the communication device 100.

Also, the processor 220 may subject a transmission signal to various processes and transmit the processed signal to the transmitter 211, and may process a signal received through the receiver 212.

When needed, the processor 220 may store information included in an exchanged message in a memory 230. The BS 200 having the above-described configuration may perform the afore-described methods according to various embodiments of the present invention.

The processors 120 and 220 of the communication device 100 and the BS 200 instruct (e.g., control, adjust, and manage) operations of the communication device 100 and the BS 200. The processors 120 and 220 may be connected respectively to the memories 130 and 230 capable of storing program code and data. The memories 130 and 230 may store an Operating System (OS), applications, and general files, while being connected to the processors 120 and 220.

The processors 120 and 220 of the present invention may be called controllers, microcontrollers, microcomputers, and the like. Meanwhile, the processors 120 and 220 may be implemented in hardware, firmware, software, or a combination thereof.

In a firmware or software configuration, the processors 120 and 220 may be implemented in the form of modules, procedures, functions, or the like performing the above-described functions or operations. Software code may be stored in the memories 130 and 230 and executed by the processors 120 and 220. The memories 130 and 230 may be located at the interior or exterior of the communication device 100 and the BS 200 and may transmit and receive data to and from the processors 120 and 220 via various known means.

If the embodiments of the present invention are implemented in hardware, the processors 120 and 220 may include Application Specific Integrated Circuits (ASICs), Digital Signal Processors (DSPs), Digital Signal Processing Devices (DSPDs), Programmable Logic Devices (PLDs), Field Programmable Gate Arrays (FPGAs), or the like, which are configured to implement the present invention.

Meanwhile, the above-described method may be written as a computer-readable program and implemented using a computer-readable medium in a general-purpose digital computer. A data structure used in the method may be recorded on the computer-readable medium by various means. It is to be understood that program storage devices available to store a computer code executable to perform various methods of the present invention include temporal media such as carriers or signals. The computer-readable medium includes a storage medium such as a magnetic storage medium (e.g., Read Only Memory (ROM), floppy disk, and hard disk) or an optical reading medium (e.g., compact disk-read only memory (CD-ROM) or digital versatile disk (DVD)).

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The method for generating a short-latency signal in a wireless communication system according to the present invention is applicable to various wireless communication systems using a signal generation method.

What is claimed is:

1. A method for a user equipment (UE) for a short latency and high reliability service in a wireless communication system, the method comprising;
receiving downlink signals for a first service, other than a second service corresponding to the short latency and high reliability service, from a network within a downlink transmission time interval;
receiving a synchronization signal from the network;
receiving, from the network, a notification indicating that one or more OFDM symbols within the downlink transmission time interval is exclusively allocated to the second service; and
processing the received downlink signals for the first service on the assumption that there is no downlink signals for the first service intended to the UE on the one or more OFDM symbols indicated by the notification,
wherein the notification is not applicable to receiving the synchronization signal.

2. The method of claim 1, further comprising:
transmitting signals for the second service on the one or more OFDM symbols.

3. The method of claim 1, wherein the notification indicates that the one or more OFDM symbols within the downlink transmission time interval is exclusively allocated to uplink transmission for the second service.

4. A user equipment (UE) for a short latency and high reliability service in a wireless communication system, the UE comprising;
a transceiver configured to:
receive downlink signals for a first service, other than a second service corresponding to the short latency and high reliability service, from a network within a transmission time interval,
receive a synchronization signal from the network, and
receive, from the network, a notification indicating that one or more OFDM symbols within the downlink transmission time interval is exclusively allocated to the second service; and
a processor connected to the transceiver and configured to process the received downlink signals for the first service on the assumption that there is no downlink signals for the first service on the one or more OFDM symbols indicated by the notification,
wherein the notification is not applicable to receiving the synchronization signal.

5. The UE of claim 4, wherein the processor is further configured to control the transceiver to transmit signals for the second service on the one or more OFDM symbols.

6. The UE of claim 4, wherein the notification indicates that the one or more OFDM symbols within the downlink transmission time interval is exclusively allocated to uplink transmission for the second service.

* * * * *